(12) United States Patent
Parkinson et al.

(10) Patent No.: US 9,301,085 B2
(45) Date of Patent: Mar. 29, 2016

(54) COMPUTER HEADSET WITH DETACHABLE 4G RADIO

(71) Applicant: Kopin Corporation, Westborough, MA (US)

(72) Inventors: Christopher Parkinson, Richland, WA (US); Jeffrey J. Jacobsen, Hollister, CA (US); Stephen A. Pombo, Campbell, CA (US); David Bruce Ferguson, Boca Raton, FL (US)

(73) Assignee: Kopin Corporation, Westborough, MA (US)

( * ) Notice: Subject to any disclaimer, the term of this patent is extended or adjusted under 35 U.S.C. 154(b) by 23 days.

(21) Appl. No.: 14/175,767

(22) Filed: Feb. 7, 2014

(65) Prior Publication Data

US 2014/0235169 A1  Aug. 21, 2014

Related U.S. Application Data

(60) Provisional application No. 61/767,026, filed on Feb. 20, 2013.

(51) Int. Cl.
| | |
|---|---|
| *H04W 4/00* | (2009.01) |
| *H04R 5/033* | (2006.01) |
| *H04M 1/725* | (2006.01) |
| *H04M 1/60* | (2006.01) |

(Continued)

(52) U.S. Cl.
CPC .......... *H04W 4/008* (2013.01); *H04M 1/72522* (2013.01); *H04R 5/033* (2013.01); *H04M 1/05* (2013.01); *H04M 1/6066* (2013.01); *H04M 2250/02* (2013.01); *H04M 2250/04* (2013.01); *H04R 5/04* (2013.01); *H04R 2420/07* (2013.01)

(58) Field of Classification Search
CPC ............ H04M 1/6058; H04M 1/6066; H04M 2250/16; H04M 1/23; H04M 1/0247; H04M 1/05
USPC ............... 455/575.2, 575.1, 575.6, 572, 41.2, 455/3.06
See application file for complete search history.

(56) References Cited

U.S. PATENT DOCUMENTS

| 5,005,213 A | 4/1991 | Hanson et al. |
| 5,594,469 A | 1/1997 | Freeman et al. |

(Continued)

FOREIGN PATENT DOCUMENTS

| CN | 1797299 A | 7/2006 |
| CN | 101581969 A | 11/2009 |

(Continued)

OTHER PUBLICATIONS

International Preliminary Report on Patentability and Written Opinion, PCT/US2011/023337, mailing date, "Wireless Hands-Free Computing Headset with Detachable Accessories Controllable by Motion, Body Gesture and/or Vocal Commands", Aug. 16, 2012, 8 pages.

(Continued)

*Primary Examiner* — Minh D Dao
(74) *Attorney, Agent, or Firm* — Hamilton, Brook, Smith & Reynolds, P.C.

(57) ABSTRACT

A headset computer includes a removably attachable cellular radio. The cellular radio when detached from the headset computer may be coupled to a docking station for WIFI or similar network communication to the headset computer.

19 Claims, 5 Drawing Sheets

(51) Int. Cl.
*H04R 5/04* (2006.01)
*H04M 1/05* (2006.01)

(56) References Cited

U.S. PATENT DOCUMENTS

| | | | |
|---|---|---|---|
| 5,990,793 A | 11/1999 | Bieback | |
| 6,010,216 A | 1/2000 | Jesiek | |
| 6,084,556 A | 7/2000 | Zwern | |
| 6,108,197 A | 8/2000 | Janik | |
| 6,198,462 B1 | 3/2001 | Daily et al. | |
| 6,204,974 B1 | 3/2001 | Spitzer | |
| 6,313,864 B1 | 11/2001 | Tabata et al. | |
| 6,325,507 B1 | 12/2001 | Jannard et al. | |
| 6,369,952 B1 | 4/2002 | Rallison et al. | |
| 6,538,676 B1 | 3/2003 | Peters et al. | |
| 6,778,906 B1 | 8/2004 | Hennings et al. | |
| 6,798,391 B2 | 9/2004 | Peterson, III | |
| 6,853,293 B2 | 2/2005 | Swartz et al. | |
| 6,900,777 B1 | 5/2005 | Hebert et al. | |
| 6,922,184 B2 | 7/2005 | Lawrence et al. | |
| 6,956,614 B1 | 10/2005 | Quintana et al. | |
| 6,966,647 B2 | 11/2005 | Jannard et al. | |
| 7,004,582 B2 | 2/2006 | Jannard et al. | |
| 7,013,009 B2 | 3/2006 | Warren | |
| 7,082,393 B2 | 7/2006 | Lahr | |
| 7,147,324 B2 | 12/2006 | Jannard et al. | |
| 7,150,526 B2 | 12/2006 | Jannard et al. | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,249,846 B2 | 7/2007 | Grand et al. | |
| 7,278,734 B2 | 10/2007 | Jannard et al. | |
| 7,331,666 B2 | 2/2008 | Swab et al. | |
| 7,445,332 B2 | 11/2008 | Jannard et al. | |
| 7,452,073 B2 | 11/2008 | Jannard et al. | |
| 7,458,682 B1 | 12/2008 | Lee | |
| 7,461,936 B2 | 12/2008 | Jannard | |
| 7,494,216 B2 | 2/2009 | Jannard et al. | |
| 7,501,995 B2 | 3/2009 | Morita et al. | |
| 7,512,414 B2 | 3/2009 | Jannard et al. | |
| 7,620,432 B2 | 11/2009 | Willins et al. | |
| 7,620,433 B2* | 11/2009 | Bodley | 455/575.2 |
| 7,682,018 B2 | 3/2010 | Jannard | |
| 7,740,353 B2 | 6/2010 | Jannard | |
| 7,744,213 B2 | 6/2010 | Jannard et al. | |
| 7,753,520 B2 | 7/2010 | Fuziak, Jr. | |
| 7,760,898 B2 | 7/2010 | Howell et al. | |
| 7,798,638 B2 | 9/2010 | Fuziak, Jr. | |
| 7,806,525 B2 | 10/2010 | Howell et al. | |
| 8,108,143 B1* | 1/2012 | Tester | 701/468 |
| 8,170,262 B1* | 5/2012 | Liu | 381/382 |
| 8,184,983 B1 | 5/2012 | Ho et al. | |
| 8,577,427 B2* | 11/2013 | Serota | 455/575.2 |
| 8,855,719 B2 | 10/2014 | Jacobsen et al. | |
| 8,862,186 B2 | 10/2014 | Jacobsen et al. | |
| 8,929,954 B2 | 1/2015 | Jacobsen et al. | |
| 9,122,307 B2 | 9/2015 | Jacobsen et al. | |
| 2001/0003712 A1 | 6/2001 | Roelofs | |
| 2002/0015008 A1 | 2/2002 | Kishida et al. | |
| 2002/0030649 A1 | 3/2002 | Zavracky et al. | |
| 2002/0044152 A1 | 4/2002 | Abbott, III et al. | |
| 2002/0065115 A1* | 5/2002 | Lindholm | 455/568 |
| 2002/0094845 A1 | 7/2002 | Inasaka | |
| 2002/0154070 A1 | 10/2002 | Sato et al. | |
| 2003/0016253 A1 | 1/2003 | Aoki et al. | |
| 2003/0065805 A1 | 4/2003 | Barnes, Jr. | |
| 2003/0067536 A1 | 4/2003 | Boulanger et al. | |
| 2003/0068057 A1 | 4/2003 | Miller et al. | |
| 2004/0113867 A1 | 6/2004 | Tomine et al. | |
| 2004/0193413 A1 | 9/2004 | Wilson et al. | |
| 2004/0210852 A1 | 10/2004 | Balakrishnan et al. | |
| 2004/0267527 A1 | 12/2004 | Creamer et al. | |
| 2005/0114140 A1 | 5/2005 | Brackett et al. | |
| 2005/0237296 A1 | 10/2005 | Lee | |
| 2005/0245292 A1 | 11/2005 | Bennett et al. | |
| 2005/0264527 A1 | 12/2005 | Lin | |
| 2006/0010368 A1 | 1/2006 | Kashi | |
| 2006/0028400 A1 | 2/2006 | Lapstun et al. | |
| 2006/0061551 A1 | 3/2006 | Fateh | |
| 2006/0109237 A1 | 5/2006 | Morita et al. | |
| 2006/0132382 A1 | 6/2006 | Jannard | |
| 2006/0166705 A1* | 7/2006 | Seshadri et al. | 455/569.1 |
| 2006/0178085 A1 | 8/2006 | Sotereanos et al. | |
| 2006/0221266 A1 | 10/2006 | Kato et al. | |
| 2007/0009125 A1 | 1/2007 | Frerking et al. | |
| 2007/0030174 A1 | 2/2007 | Randazzo et al. | |
| 2007/0053544 A1* | 3/2007 | Jhao et al. | 381/384 |
| 2007/0093279 A1* | 4/2007 | Janik | 455/569.1 |
| 2007/0103388 A1 | 5/2007 | Spitzer | |
| 2007/0180979 A1 | 8/2007 | Rosenberg | |
| 2007/0220108 A1 | 9/2007 | Whitaker | |
| 2007/0238475 A1* | 10/2007 | Goedken | 455/512 |
| 2007/0265495 A1 | 11/2007 | Vayser | |
| 2008/0055194 A1 | 3/2008 | Baudino et al. | |
| 2008/0084992 A1 | 4/2008 | Peddireddy et al. | |
| 2008/0120141 A1 | 5/2008 | Kariathungal et al. | |
| 2008/0144854 A1 | 6/2008 | Abreu | |
| 2008/0180640 A1 | 7/2008 | Ito | |
| 2008/0198324 A1 | 8/2008 | Fuziak | |
| 2008/0200774 A1 | 8/2008 | Luo | |
| 2008/0239080 A1 | 10/2008 | Moscato | |
| 2009/0002640 A1 | 1/2009 | Yang et al. | |
| 2009/0079839 A1 | 3/2009 | Fischer et al. | |
| 2009/0093304 A1 | 4/2009 | Ohta | |
| 2009/0099836 A1 | 4/2009 | Jacobsen et al. | |
| 2009/0117890 A1 | 5/2009 | Jacobsen et al. | |
| 2009/0128448 A1 | 5/2009 | Riechel | |
| 2009/0154719 A1 | 6/2009 | Wulff et al. | |
| 2009/0180195 A1 | 7/2009 | Cakmakci et al. | |
| 2009/0182562 A1 | 7/2009 | Claire et al. | |
| 2009/0204410 A1 | 8/2009 | Mozer et al. | |
| 2009/0251409 A1 | 10/2009 | Parkinson et al. | |
| 2010/0020229 A1 | 1/2010 | Hershey et al. | |
| 2010/0033830 A1 | 2/2010 | Yung | |
| 2010/0053069 A1 | 3/2010 | Tricoukes et al. | |
| 2010/0117930 A1 | 5/2010 | Bacabara et al. | |
| 2010/0119052 A1 | 5/2010 | Kambli | |
| 2010/0121480 A1 | 5/2010 | Stelzer et al. | |
| 2010/0128626 A1 | 5/2010 | Anderson et al. | |
| 2010/0141554 A1 | 6/2010 | Devereaux et al. | |
| 2010/0156812 A1 | 6/2010 | Stallings et al. | |
| 2010/0164990 A1 | 7/2010 | Van Doorn | |
| 2010/0171680 A1 | 7/2010 | Lapidot et al. | |
| 2010/0182137 A1 | 7/2010 | Pryor | |
| 2010/0238184 A1 | 9/2010 | Janicki | |
| 2010/0245585 A1* | 9/2010 | Fisher et al. | 348/164 |
| 2010/0250231 A1 | 9/2010 | Almagro | |
| 2010/0271587 A1 | 10/2010 | Pavlopoulos | |
| 2010/0277563 A1 | 11/2010 | Gupta et al. | |
| 2010/0289817 A1 | 11/2010 | Meier et al. | |
| 2010/0302137 A1 | 12/2010 | Benko et al. | |
| 2010/0306711 A1* | 12/2010 | Kahn et al. | 715/863 |
| 2010/0309295 A1 | 12/2010 | Chow | |
| 2011/0001699 A1 | 1/2011 | Jacobsen et al. | |
| 2011/0092825 A1 | 4/2011 | Gopinathan et al. | |
| 2011/0134910 A1 | 6/2011 | Chao-Suren et al. | |
| 2011/0187640 A1 | 8/2011 | Jacobsen et al. | |
| 2012/0013843 A1 | 1/2012 | Jannard | |
| 2012/0068914 A1 | 3/2012 | Jacobsen et al. | |
| 2012/0075177 A1 | 3/2012 | Jacobsen et al. | |
| 2012/0089392 A1 | 4/2012 | Larco et al. | |
| 2012/0110456 A1 | 5/2012 | Larco et al. | |
| 2012/0166203 A1* | 6/2012 | Fuchs et al. | 704/275 |
| 2012/0236025 A1 | 9/2012 | Jacobsen et al. | |
| 2012/0287284 A1 | 11/2012 | Jacobsen et al. | |
| 2012/0302288 A1* | 11/2012 | Born et al. | 455/557 |
| 2013/0070930 A1* | 3/2013 | Johnson | 381/57 |
| 2013/0174205 A1 | 7/2013 | Jacobsen et al. | |
| 2013/0231937 A1 | 9/2013 | Woodall et al. | |
| 2013/0289971 A1 | 10/2013 | Parkinson et al. | |
| 2013/0300649 A1 | 11/2013 | Parkinson et al. | |
| 2014/0003616 A1* | 1/2014 | Johnson et al. | 381/74 |
| 2014/0059263 A1* | 2/2014 | Rosenberg et al. | 710/303 |

(56) References Cited

U.S. PATENT DOCUMENTS

| | | | |
|---|---|---|---|
| 2014/0093103 A1* | 4/2014 | Breece et al. | 381/120 |
| 2014/0235169 A1 | 8/2014 | Parkinson et al. | |
| 2014/0368412 A1 | 12/2014 | Jacobsen et al. | |
| 2015/0039311 A1* | 2/2015 | Clark et al. | 704/244 |
| 2015/0072672 A1 | 3/2015 | Jacobsen et al. | |

FOREIGN PATENT DOCUMENTS

| | | |
|---|---|---|
| CN | 101599267 A | 12/2009 |
| WO | WO 95/21408 | 8/1995 |
| WO | WO 95/23994 | 9/1995 |
| WO | WO 2009/076016 | 6/2009 |
| WO | WO 2009/120984 A1 | 10/2009 |
| WO | WO 2011/051660 | 5/2011 |
| WO | WO 2011/097226 | 8/2011 |
| WO | WO 2011/114149 A1 | 9/2011 |
| WO | WO 2012/040386 | 3/2012 |

OTHER PUBLICATIONS

International Search Report and Written Opinion for PCT/US2013/065927 dated Mar. 21, 2014, entitled, "Improved Headset Computer Operation Using Vehicle Sensor Feedback for Remote Control Vehicle".

Morphew, M.E., et al., "Helmet Mounted Displays for Unmanned Aerial Vehicle Control", Proceedings of SPIE, vol. 5442, Oct. 20, 2004.

Notification Concerning Transmittal of International Preliminary Report on Patentability of PCT/US2012/037284, "Headset Computer That Uses Motion and Voices to Control Information Display and Remote Devices", Date of Mailing: Nov. 21, 2013, 7 pages.

EP 12782481.1 Supplemental European Search Report, "Context Sensitive Overlays in Voice Controlled Headset Computer Displays," dated Sep. 29, 2014.

Notification of Transmittal of the International Search Report and the Written Opinion, including International Search Report and Written Opinion; International Application No. PCT/US2011/023337, Date of Mailing Mar. 28, 2011, including Search History, entitled "Wireless Hands-Free Computing Headset with Detachable Accessories Controllable by Motion, Body Gesture and/or Vocal Commands".

Notification Concerning Transmittal of International Preliminary Report on Patentability for Application No. PCT/US2011/023337, dated Aug. 16, 2012, consisting of 8 pages, entitled "Wireless Hands-Free Computing Headset with Detachable Accessories Controllable by Motion, Body Gesture and/or Vocal Commands".

Notification of Transmittal of International Search Report and Written Opinion of PCT/US2012/037284 dated Oct. 1, 2012, entitled "Headset Computer That Uses Motion and Voices to Control Information Display and Remote Devices".

Notification of Transmittal of International Search Report and Written Opinion of PCT/US2012/068686, Date of Mailing: Mar. 25, 2013, 11 pages (title inaccessible).

European Search Report for EP 12782481.1 dated Sep. 29, 2014.

* cited by examiner

COMPUTER HEADSET WITH DETACHABLE 4G RADIO

RELATED APPLICATION

This application claims the benefit of U.S. Provisional Application No. 61/767,026, filed on Feb. 20, 2013. This application is a continuation-in-part of U.S. application Ser. No. 13/018,999, filed Feb. 1, 2011, which claims the benefit of prior U.S. Provisional Application No. 61/300,611, filed on Feb. 2, 2010 and which also claims priority to U.S. application Ser. No. 12/774,179, filed May 5, 2010, which claims the benefit of U.S. Provisional Application No. 61/176,662, filed on May 8, 2009 and U.S. Provisional Application No. 61/237,884, filed on Aug. 28, 2009.

The entire teachings of the above applications are incorporated herein by reference.

BACKGROUND OF THE INVENTION

Mobile computing devices, such as notebook PC's, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to either eyeglasses, audio headset or video eyewear. A "wireless computing headset" device includes one or more small high-resolution micro-displays and optics to magnify the image. The WVGA microdisplay's can provide super video graphics array (SVGA) (800×600) resolution or extended graphic arrays (XGA) (1024×768) or even higher resolutions. A wireless computing headset contains one or more wireless computing and communication interfaces, enabling data and streaming video capability, and provides greater convenience and mobility than hands dependent devices. For more information concerning such devices, see co-pending U.S. application Ser. No. 12/348,646 entitled "Mobile Wireless Display Software Platform for Controlling Other Systems and Devices," by Jacobsen et al., filed Jan. 5, 2009, PCT International Application No. PCT/US09/38601 entitled "Handheld Wireless Display Devices Having High Resolution Display Suitable For Use as a Mobile Internet Device," filed Mar. 27, 2009, and U.S. application Ser. No. 61/638,419 entitled "Improved Headset Computer," filed Apr. 25, 2012, each of which are incorporated herein by reference in their entirety.

Example embodiments presented in the present application provide a headset computing device, and corresponding method for communicating, with a detachable (or removeably attachable) cellular radio.

Example embodiments of the present invention include a headset computing device, a cellular radio module, and a docking base-station. A headset computer can include a frame carrying a digital processor and a power source wearable on a user's head and a cellular module removablely attached to the frame and operatively coupled to the digital processor and power source. The cellular module can provide a portable cellular radio for cellular-based communications. When the cellular module is detached from the frame, it is attachable to a docking station which enables the cellular radio to communicate over a WIFI or similar low power communications link to the processor in the frame.

A further example embodiment can include a headset computing device including a frame to support a microdisplay, processor, power supply, low-power communications module, connection interface or periphery port, being operatively coupled together, and a cellular radio module removably attached to the frame and operatively connected to the processor and power supply through the connection interface. The frame is configured to be worn on the head of a user, and to support the processor, power supply, low-power communications module, the connection interface, and the microdisplay (within the field of view of the user). When the cellular radio module is detached from the frame, it can be attachable to a docking station (DS), the DS including a DS processor, DS power supply, and DS low-power communications module. The DS can include a DS processor, DS power supply, and DS low-power communications module configured to communicate with the low-power communications module supported by the frame.

The cellular radio module can include a radio frequency (RF) antenna, a RF transceiver, and a digital signal processor (DSP), the RF antenna, the RF transceiver, and the DSP being operatively coupled to enable communications using mobile phone communication protocols. The mobile phone communication protocols include short messaging service (SMS), multimedia messaging service (MMS), 3G, and/or 4G LTE protocols. The mobile phone communication protocols can include code division multiple access (CDMA)-based protocols or Global System for Mobile Communications (GSM)-based protocols. The low-power communications module includes a Bluetooth transceiver configured to use Bluetooth communication protocols or wireless local area network (WLAN) Wi-Fi communication protocols.

In an embodiment, the cellular module can be detached from the frame. The cellular module can be attachable to a docking station, the docking station configured to enable the cellular radio to communicate over a short range or similar network to the digital processor carried by the frame. The short range network can be at least one of Bluetooth and WiFi.

Further embodiments include a method of communicating between a headset computing device and a remote networked computing device including transmitting wirelessly from the headset computing device using a first low power transceiver, receiving the wireless transmission at a second low power transceiver in a docking base-station, relaying the transmission to a cellular radio module operatively couple to the docking base-station, and transmitting wirelessly from the cellular radio module using a high power radio frequency transceiver to the networked computing device.

BRIEF DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
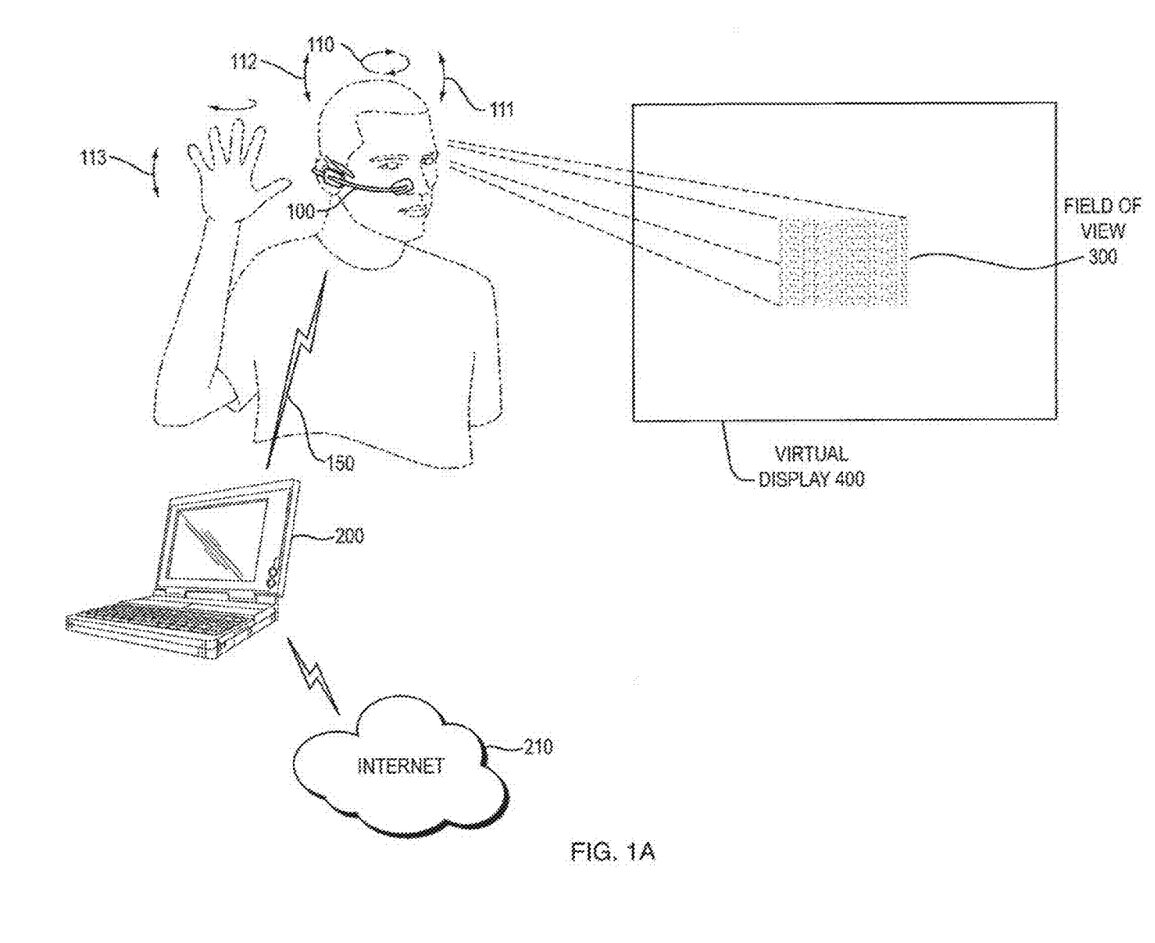
FIGS. 1A-1B illustrate example embodiments of a headset computer and a headset computer cooperating with a host computer (e.g., Smart Phone, laptop, etc.) according to principles of the present invention.
Figure 1B:
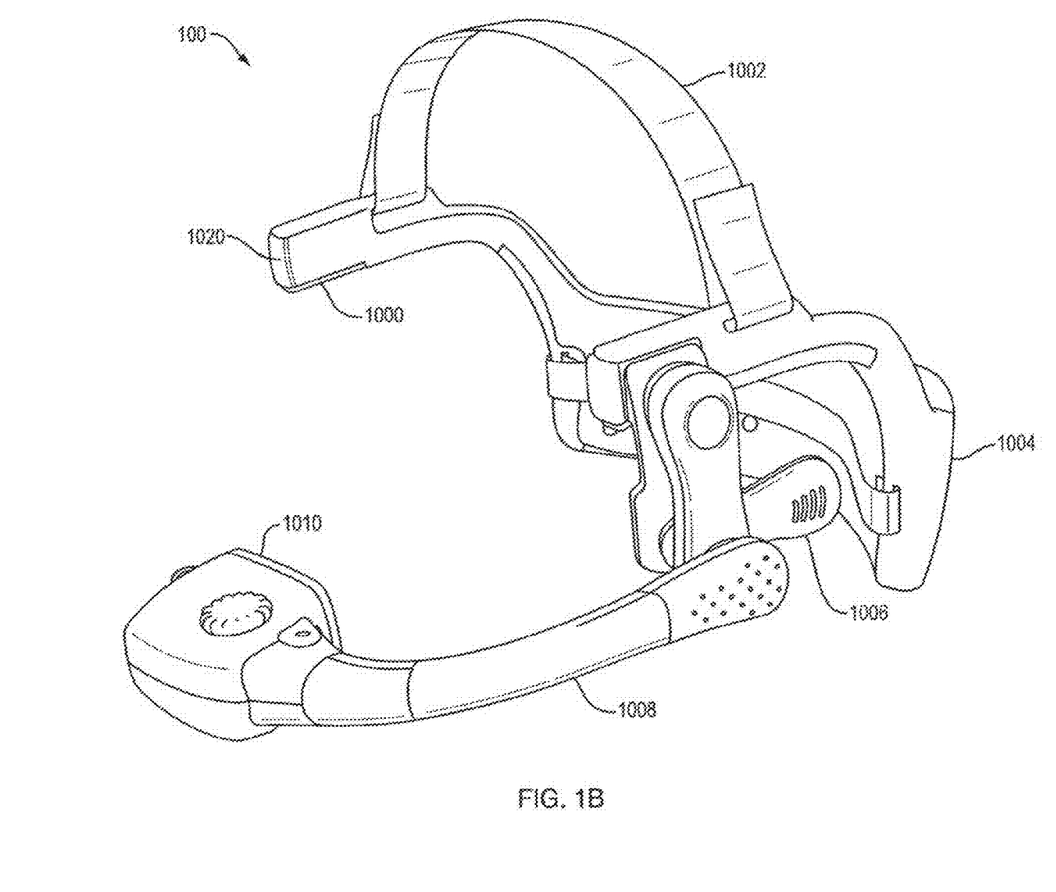

FIGS. 1A and 1B illustrate an example embodiment of a wireless computing headset device 100 (also referred to herein as a headset computer (HSC)) that incorporates a high-resolution (VGA or better) microdisplay element 1010, and other features described below. HSC 100 can include audio input and/or output devices, including one or more microphones, speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports (not shown in detail in FIG. 1B). Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. Microphone(s) operatively coupled or preferably integrated into the HSC 100 can be used to capture speech commands which are then digitized and processed using automatic speech recognition techniques. Gyroscopes, accelerometers, and other micro-electromechanical system sensors can be integrated into the HSC 100 and used to track the user's head movement to provide user input commands. Cameras or other motion tracking sensors can be used to monitor a user's hand gestures for user input commands. Such a user interface overcomes the hands-dependant formats of other mobile devices.

The headset computing device 100 can be used in various ways. It can be used as a remote display for streaming video signals received from a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The host may be further connected to other networks 210, such as the Internet. The headset computing device 100 and host 200 can wirelessly communicate via one or more wireless protocols, such as Bluetooth®, Wi-Fi, WiMAX or other wireless radio link 150. (Bluetooth is a registered trademark of Bluetooth Sig, Inc. of 5209 Lake Washington Boulevard, Kirkland, Wash. 98033.) In an example embodiment, the host 200 may be further connected to other networks, such as through a wireless connection to the Internet or other cloud-based network resources, so that the host 200 can act as a wireless relay. Alternatively, some example embodiments of the HSC 100 can wirelessly connect to the Internet and cloud-based network resources without the use of a host wireless relay.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with built in microphone(s), and a micro-display subassembly 1010.

Of interest to an embodiment of the present invention is the detail shown wherein one side of the device 100 opposite the cantilever arm 1008 is a peripheral port 1020. The peripheral port 1020 provides corresponding connections to one or more accessory peripheral devices (as explained in detail below), so a user can removably attach various accessories to the device 100. An example port 1020 provides a mechanical and electrical accessory mount such as a hot shoe. Wiring carries electrical signals from port 1020 through, for example, the back portion 1004 to circuitry disposed therein. Hot shoe 1020 can operate much like the hot shoe on a camera, automatically providing connections to power the accessory and carry signals to and from the rest of device 100.

Various types of accessories can be used with port 1020 to provide the hand movements, head movements, and or vocal inputs to the system, such as but not limited to microphones, positional, orientation and other previously described sensors, cameras, speakers, and the like. The location of the periphery port (or ports) 1020 can vary according to various types of accessories to be used and with other embodiments of the HSC 100.

A head worn frame 1000 and strap 1002 are generally configured so that a user can wear the headset computer device 100 on the user's head. A housing 1004 is generally a low profile unit which houses the electronics, such as the microprocessor, memory or other storage device, low power wireless communications device(s), along with other associated circuitry. Speakers 1006 provide audio output to the user so that the user can hear information, such as the audio portion of a multimedia presentation, or audio alert or feedback signaling recognition of a user command. Microdisplay subassembly 1010 is used to render visual information to the user. The microdisplay subassembly 1010 is coupled to the arm 1008. The arm 1008 generally provides physical support such that the microdisplay subassembly is able to be positioned within the user's field of view 300 (FIG. 1A), preferably in front of the eye of the user or within its peripheral vision preferably slightly below or above the eye. Arm 1008 also provides the electrical or optical connections between the microdisplay subassembly 1010 and the control circuitry housed within housing unit 1004.

According to aspects explained in further detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A-1B illustrate HSCs 100 having monocular microdisplays presenting a single fixed display element supported within the filed of view in front of the face of the user with a cantilevered boom, other mechanical configurations for the remote control display device HSC 100 can be employed.

Figure 2:
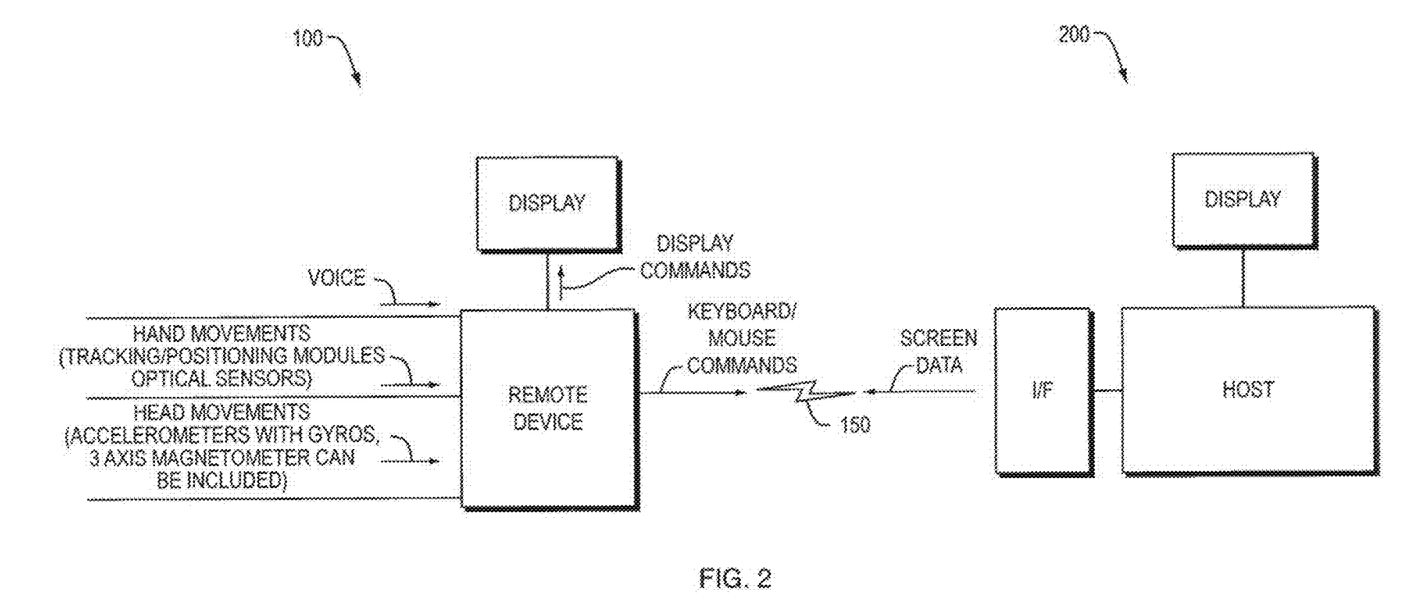
FIG. 2 is a block diagram of flow of data and control in the embodiment of FIGS. 1A-1B.

FIG. 2 is a block diagram illustrating further detail of the HSC device 100, host 200 and the data that communicated between them. The HSC device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These user inputs are translated by software in the HSC device 100 into commands (e.g., keyboard and/or mouse commands) that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC device 100.

In one embodiment the HSC 100 may take the form of the HSC described in a co-pending U.S. Patent Publication No. 2011/0187640 entitled "Wireless Hands-Free Computing Headset With Detachable Accessories Controllable By Motion, Body Gesture And/Or Vocal Commands" by Pombo et al. filed Feb. 1, 2011, which is hereby incorporated by reference in its entirety.

In another example embodiment, the invention relates to the concept of using a HSC (or Head Mounted Display (HMD)) 100 with microdisplay 1010 in conjunction with an external 'smart' device 200 (such as a smartphone or tablet) to provide information and hands-free user control. The invention requires transmission of small amounts of data, providing a more reliable data transfer method running in real-time.

In this sense therefore, the amount of data to be transmitted over the wireless connection 150 is small. The data includes instructions for screen layout format, which text to display, and other stylistic information such as drawing arrows, background colours, images to include, etc.

The same wireless connection 150 or another connection can stream data to be displayed on screen 1010, such as a video stream, if required by the host controller 200.

Applicants have previously discussed and disclosed a versatile computer headset with built in Bluetooth and Wi-Fi radios. Applicants have also long dreamed of having a cellular radio built into computer headset devices to enable 'always connected' capability, but have at the same time decided not to build in cellular for two reasons:
 a) Weight: cellular radio (3G, 4G LTE, etc.) can require significant transmit power, which in turn would require additional battery power. Conventionally, additional battery power can be provided by increasing the size of the battery. Because battery weight is proportional to battery size, such an increase equates to more weight on the user's head.
 b) RF Energy: Many consumers believe that exposure to prolonged durations of intense RF energy close to the head can be damaging to the brain. Scientific evidence to support this belief is sparse, but none the less, consumer opinion should be considered.

Figure 3A:
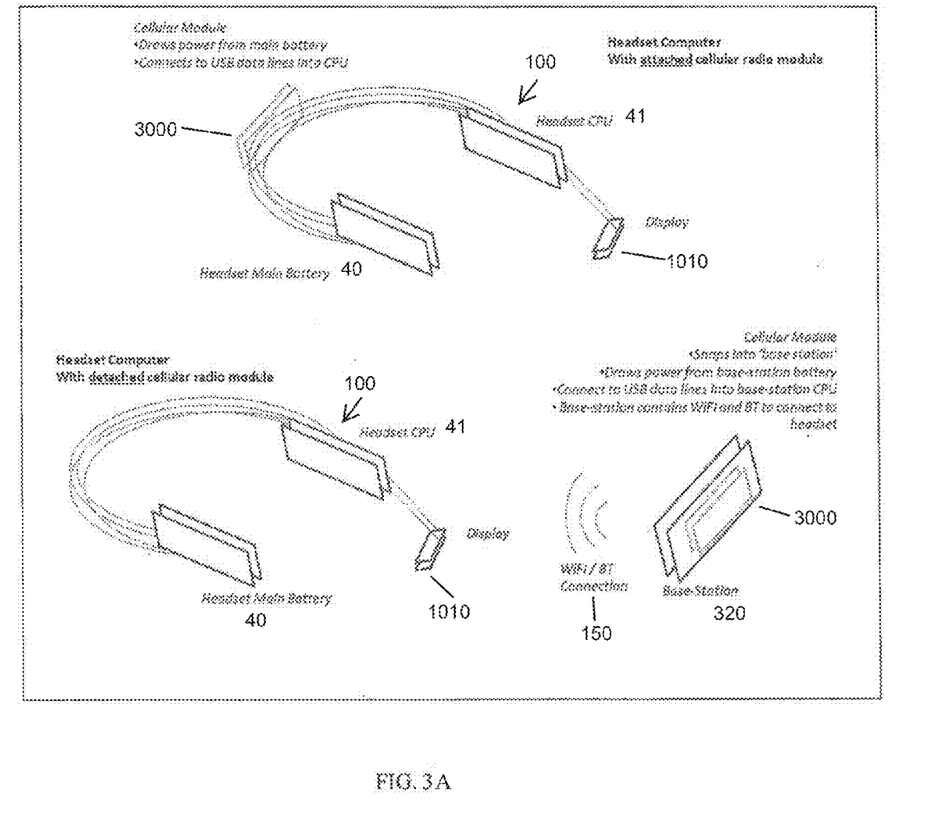
FIGS. 3A-3B illustrate example embodiments of a headset computer with attached cellular radio module and docking base station and a high level block diagram of the same.
Figure 3B:
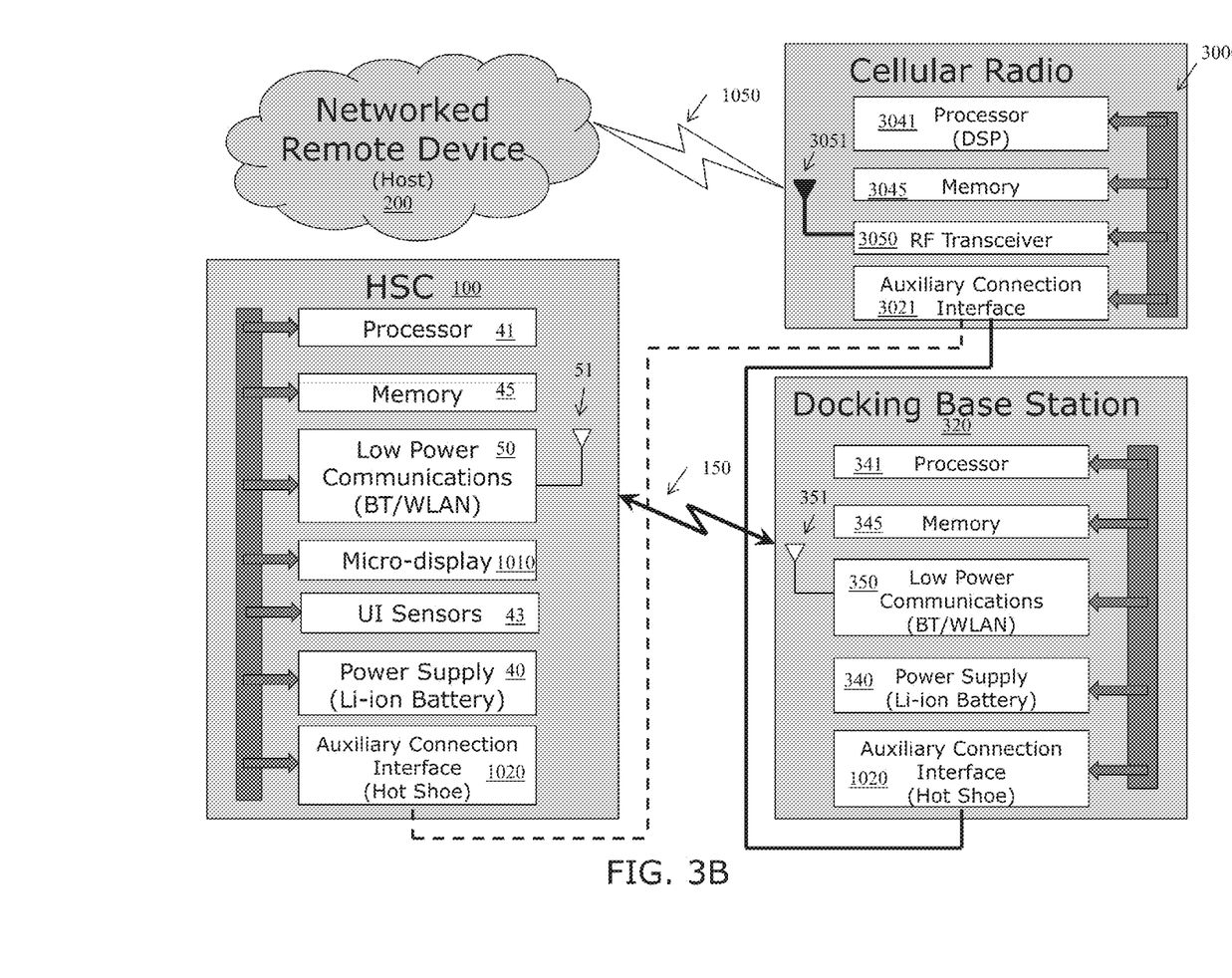

An embodiment of the present invention allows a best of both worlds solution by providing the cellular radio portion of the headset computer 100 as a detachable cellular radio module 3000. FIGS. 3A and 3B illustrate such an embodiment.

The cellular radio module 3000 is a relatively small module with cellular radio, a power connector, and data interface (input/output (I/O) connector).

When attached to the headset computer 100, through a hot shoe and periphery port (or mount) that provides power and communications connectivity, the cellular module 3000 provides built-in cellular connectivity, drawing power from the main headset computer battery 40. The cellular module 3000 connects via the data connector (periphery port or hot shoe) to the main headset computer (CPU 41), in a similar manner as a USB data connector. In the attached configuration mode, the cellular module 3000 can be used for short duration cellular connectivity. Such short duration cellular connectivity does not drain the main battery 40 exessively, and does not expose the user's head to excessive additional radiated RF energy.

When detached from the headset 100, the cellular radio module 3000 (or radio) may be attached to a portable docking base-station unit 320, not to be confused with a conventional cellular base station, which typically includes multiple antennas mounted on a tower and switching and routing equipment. The wireless docking base-station is a small device having a pocket-sized form factor including a power supply 340 (e.g., a battery) and a processor 341, such as a digital signal processor (DSP) having a size selected based on power and processing capabilities, a low power communications module 350, such as Bluetooth and WIFI radios providing wireless connectivity 150, memory 345 and an auxiliary connection interface 1020. The docking base-station unit 320 is small enough to fit in a pocket. The base station 320 powers the cellular radio module and uses low power WIFI or Bluetooth to connect to the HSC 100. In this form, the cellular radio module 3000 can be used for longer periods of cellular connection because it has the necessary battery life to do so and keeps the source of radiated RF energy away from the head of the user.

FIG. 3B is a high level block diagram with select components illustrating functionality of the HSC 100 cellular radio module 3000, and docking base station 320.

The HSC 100 includes: a processor 41, memory 45 or some other storage device, low power communications module 50, micro-display 1010, power supply 40, user interface components 43, including microphone(s), speaker(s), motion detectors such as accelerometer(s) and gyroscope(s), and peripheral report auxiliary port (or connection interface or hot shoe) 1020. Low power communications module 50 can include a Bluetooth radio and/or a wireless local area network (WLAN) Wi-Fi radio and associated antenna(s) 51. The power supply 40 can be preferably a lithium ion battery and can provide power to a peripheral device in connection with auxiliary connection interface 1020.

The cellular radio module 3000 provides 3G and 4G LTE cellular data capabilities in addition to SMS, MMS, and voice calling. The cellular radio module 3000 includes a processor (such as a digital signal processor (DSP)) 3041, memory or other digital storage device 3045, radio frequency (RF) transceiver 3050, and auxiliary connection interface 3021. RF transceiver 3050 can support cellular-based communications using RF antenna(s) 3051. Auxiliary connection interface 3021 is a physical interface (such as a USB, miniUSB, microUSB, etc.) connecting between the cellular radio module 3000 and a reciprocal receiving auxiliary connection interface, such as the auxiliary connection interface 1020 of the HSC 100 or the docking base-station 320. Power and data can be transferred to the cellular radio module 3000 via auxiliary connection interface 3021.

Docking base-station 320 includes a processor 341, a memory or digital storage device 345, low-power communications module 350, power supply 340, and auxiliary connection interface (hot shoe) 1020. Low-power communications module 350 can include a Bluetooth radio and/or a Wi-Fi (WLAN) radio and antenna(s) 351. Auxiliary connection interface 1020 can provide data transfer and power to a peripheral device, such as cellular radio module 3000.

As indicated by the connection lines (dashed and solid) in FIG. 3B, cellular radio 3000 can physically interface via auxiliary connection interface 3021 with the auxiliary connection interface 1020 of either HSC 100 or docking base station 320. For the case shown in FIG. 3B, cellular radio module 3000 is connected to the docking base station 320 via auxiliary connection interface 1020 as indicated by the solid black line. HSC 100 uses low-power communications module 50 and antenna 51 to wirelessly communicate 150 with docking base station 320 via low-power communications module 350 and antennas 351. Standard low power wireless protocols, such as Bluetooth and/or Wi-Fi, can be used. Docking base station 320 is operatively connected to cellular radio module 3000 via auxiliary connection interfaces 1020, 3021. Cellular radio module 3000 can connect to a networked remote device (host) 200 via cellular data protocols such as 3G and 4G LTE via RF transceiver 3050 and RF antenna 3051.

While this invention has been particularly shown and described with references to example embodiments thereof, it will be understood by those skilled in the art that various changes in form and details may be made therein without departing from the scope of the invention encompassed by the appended claims.

What is claimed is:

1. A headset computer comprising:
   a frame wearable on a user's head, the frame carrying a digital processor, a microdisplay, a power source; and
   a cellular module removably attached to the frame and operatively coupled to the digital processor and power source, the cellular module providing a portable cellular radio, and the cellular module itself containing no power source.

2. A headset computer of claim 1, wherein when the cellular module is detached from the frame, the cellular module is attachable to a docking station, the docking station configured to enable the cellular radio to communicate over a short range network to the digital processor carried in the frame.

3. The headset computer of claim 2, wherein the short range network is at least one of a WIFI network or a Bluetooth network.

4. A headset computing device comprising:
   a microdisplay;
   a processor;
   a power supply operatively coupled to the processor;
   a low-power communications module operatively coupled to the processor and the power supply;
   a connection interface configured to operatively connect to the processor and the power supply;
   a frame configured to be worn on the head of a user, and further configured to support the processor, the power supply, the low-power communications module, the connection interface, and the microdisplay, the microdisplay being supported within the field of view of the user; and
   a cellular radio module removably attached to the frame and operatively connected to the processor and power supply through the connection interface, and the cellular radio module itself containing no power source.

5. The headset computing device of claim 4, wherein when cellular radio module is detached from the frame, the cellular module further being attachable to a docking station (DS), the DS including a DS processor, DS power supply, and DS low-power communications module configured to communicate with the low-power communications module supported by the frame.

6. The headset computing device of claim 4, wherein the cellular radio module further includes a radio frequency (RF) antenna, a RF transceiver, and a digital signal processor (DSP), the RF antenna, the RF transceiver, and the DSP being operatively coupled to enable communications using mobile phone communication protocols.

7. The headset computing device of claim 6, wherein the mobile phone communication protocols include short messaging service (SMS), multimedia messaging service (MMS), 3G, and 4G LTE protocols.

8. The headset computing device of claim 6, wherein the mobile phone communication protocols include code division multiple access (CDMA)-based protocols.

9. The headset computing device of claim 6, wherein the mobile phone communication protocols include Global System for Mobile Communications (GSM)-based protocols.

10. The headset computing device of claim 4, wherein the low-power communications module includes a Bluetooth transceiver configured to use Bluetooth communication protocols.

11. The headset computing device of claim 4, wherein the low-power communications module includes a wireless local area network (WLAN) transceiver configured to use Wi-Fi communication protocols.

12. A method of communicating between a headset computing device and a remote networked computing device comprising:
    transmitting wirelessly from the headset computing device using a first low power transceiver;
    receiving the wireless transmission at a second low power transceiver in a docking base-station;
    relaying the transmission to a cellular radio module operatively coupled to the docking base-station, the cellular radio module receiving power from the docking base-station, the cellular radio module itself containing no power source; and
    transmitting wirelessly from the cellular radio module using a high power radio frequency transceiver to the networked computing device.

13. The method of claim 12, further comprising:
    enabling removal of the cellular radio module from the docking base-station;
    enabling attachment of the cellular radio module to the headset computing device.

14. The method of claim 12, further comprising:
    operatively coupling a radio frequency (RF) antenna, a RF transceiver, and a digital signal processor (DSP) in the cellular radio module; and
    enabling communications using the RF antenna, the RF transceiver, and the DSP using mobile phone communication protocols.

15. The method of claim 14, wherein the mobile phone communication protocols include short messaging service (SMS), multimedia messaging service (MMS), 3G, and 4G LTE protocols.

16. The method of claim 14, wherein the mobile phone communication protocols include code division multiple access (CDMA)-based protocols.

17. The method of claim 14, wherein the mobile phone communication protocols include Global System for Mobile Communications (GSM)-based protocols.

18. The method of claim 12, further comprising configuring the low-power transceiver to use Bluetooth communication protocols.

19. The method of claim 12, further comprising configuring the low-power transceiver to use Wi-Fi communication protocols.

* * * * *